United States Patent
Uhl et al.

(10) Patent No.: US 9,481,795 B2
(45) Date of Patent: Nov. 1, 2016

(54) UNDERWATER PELLETIZING METHOD FOR LOW VISCOSITY HYDROCARBON RESINS

(75) Inventors: Eugene Ronald Uhl, Massillon, OH (US); Edward J. Blok, Wadsworth, OH (US); Dennis Kumor, Copley, OH (US); Randal Howard Kerstetter, III, Wadsworth, OH (US); Ronald DeYoung, Westfield Center, OH (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 595 days.

(21) Appl. No.: 13/821,683

(22) PCT Filed: Aug. 25, 2011

(86) PCT No.: PCT/US2011/049132
§ 371 (c)(1),
(2), (4) Date: May 16, 2013

(87) PCT Pub. No.: WO2012/050666
PCT Pub. Date: Apr. 19, 2012

(65) Prior Publication Data
US 2013/0220516 A1     Aug. 29, 2013

Related U.S. Application Data

(60) Provisional application No. 61/392,765, filed on Oct. 13, 2010, provisional application No. 61/392,751, filed on Oct. 13, 2010, provisional application No. 61/508,238, filed on Jul. 15, 2011, provisional application No. 61/508,226, filed on Jul. 15, 2011.

(51) Int. Cl.
| | | |
|---|---|---|
| *B29B 9/06* | (2006.01) | |
| *C08L 101/02* | (2006.01) | |
| *B60C 1/00* | (2006.01) | |
| *C08C 19/25* | (2006.01) | |
| *C08J 3/12* | (2006.01) | |
| *C08L 23/22* | (2006.01) | |
| *C08F 279/00* | (2006.01) | |
| *B29D 30/06* | (2006.01) | |
| *C08K 3/36* | (2006.01) | |
| *C08L 45/00* | (2006.01) | |
| *C08L 47/00* | (2006.01) | |
| *C08F 10/14* | (2006.01) | |

(52) U.S. Cl.
CPC .............. *C08L 101/02* (2013.01); *B29B 9/065* (2013.01); *B29D 30/06* (2013.01); *B60C 1/00* (2013.01); *C08C 19/25* (2013.01); *C08F 279/00* (2013.01); *C08J 3/12* (2013.01); *C08K 3/36* (2013.01); *C08L 23/22* (2013.01); *C08L 45/00* (2013.01); *C08L 47/00* (2013.01); *C08F 10/14* (2013.01); *C08J 2351/00* (2013.01); *Y10T 156/10* (2015.01)

(58) Field of Classification Search
CPC ...................................................... B29B 9/065
USPC ......................................................... 264/142
See application file for complete search history.

(56) References Cited

U.S. PATENT DOCUMENTS

| | | | |
|---|---|---|---|
| 5,593,702 A | 1/1997 | Harris et al. | |
| 6,332,765 B1 | 12/2001 | Spelleken | |
| 7,276,557 B2 | 10/2007 | Macedo et al. | |
| 2009/0076212 A1 | 3/2009 | Lewtas et al. | |
| 2009/0186965 A1* | 7/2009 | Rodgers et al. | 524/52 |
| 2010/0007162 A1 | 1/2010 | Han et al. | |
| 2012/0041115 A1* | 2/2012 | Kumar et al. | 524/151 |

FOREIGN PATENT DOCUMENTS

| | | |
|---|---|---|
| DE | 10331451 | 1/2005 |
| WO | 98/57999 | 12/1998 |

OTHER PUBLICATIONS

OPPERA PR383 Datasheet, accessed Aug. 12, 2015.*
Mark, James E., "Polymer Data Handbook" 2nd Edition, p. 1032.*
Sine, Gleen, "A Closer Look: Techniques for Obtaining Glass Transition Temperature of Polymeric Materials", p. 2.*

* cited by examiner

*Primary Examiner* — Alison L Hindenlang
*Assistant Examiner* — Lawrence D Hohenbrink, Jr.

(57) ABSTRACT

An underwater pelletizing method for pelletizing brittle hydrocarbon resins with low melt viscosity. A feed material comprising the hydrocarbon resin is formed into a melt, extruded through a die into a water bath below the Tg of the hydrocarbon resin to form a plurality of extrudates and cut adjacent the die surface to form a slurry of resin pellets. A graft monomer and/or other reactants, such as a hydrosilylation agent, may be introduced into the resin melt to chemically modify the hydrocarbon resin.

25 Claims, No Drawings

UNDERWATER PELLETIZING METHOD FOR LOW VISCOSITY HYDROCARBON RESINS

PRIORITY CLAIM

This patent application is a National Stage Application of International Application No. PCT/US2011/049132 filed Aug. 25, 2011 which claims priority to and the benefit of U.S. Ser. No. 61/508,238, filed Jul. 15, 2011; it is also related to U.S. Ser. No. 61/508,226, filed Jul. 15, 2011; U.S. Ser. No. 61/392,751, filed Oct. 13, 2010, and U.S. Provisional application Ser. No. 61/392,765, filed Oct. 13, 2010, all of which are fully incorporated herein by reference in their entireties.

BACKGROUND (1) Field of the Invention

This invention relates to the processing of hydrocarbon resins. More particularly, this invention relates to the processing of hydrocarbon resins in melt-mixing mechanisms to obtain a pelletized form.

(2) Description of Related Art Including Information Disclosed Under 37 CFR 1.97-1.98

Many hydrocarbon resins such as piperylene- and dicyclopentadiene-based resins, as examples, may have low melt viscosity at elevated temperatures, excessive brittleness below their glass transition temperature, Tg, and other characteristics that make them difficult to process, as well as difficult to store, ship and/or handle. For example, it is difficult to extrude and pelletize low-melt-viscosity, brittle materials such as hydrocarbon resins because the molten strands from the die face have low strength and become brittle and break easily as they cool and solidify. Such hydrocarbon resins are normally pastillated using a rotoforming process.

It is sometimes desired to chemically modify the hydrocarbon resins, e.g., as in U.S. Pat. No. 7,276,557, which is difficult to do in the rotoforming process. Thus, the chemical modification may be carried out downstream in a post-rotoforming process, greatly increasing the cost and complexity of modification, particularly in view of the processing, storing, shipping and handling difficulties noted above.

In an underwater pelletizing system, a material, usually a thermoplastic polymer, is fed into an extruder or an extruder and melt pump which forces the molten polymer through a screen changer or diverter valve and through a die plate. As the polymer emerges from the die, pellets are cut by rotating blades and solidified in the process water flowing in a closed loop across the die face inside the cutting chamber. The process water transports the pellets to a centrifugal dryer where water is removed and the dry pellets are discharged.

Polymer materials with a low melt viscosity are notoriously difficult to process in underwater pelletizer systems, tend to smear at the die face and/or are comminuted to fines or dust before they can be packaged, e.g., while being transported in the slurry or dried in the rotary drier. See, for example, U.S. Pat. No. 5,962,033 (col. 2, ll. 56-63) and U.S. Pat. No. 5,593,702.

One solution in the case of low-melt-viscosity, brittle materials such as hydrocarbon resins has been to process the material by employing a polymeric carrier such as polyolefin. See U.S. Patent Publication No. 2009/076212. The polyolefin is mixed with the resin and thus serves to increase the melt viscosity and avoid low-temperature brittleness. While this solution is applicable to an extruder, including in an underwater pelletization process, it has the disadvantage of introducing the carrier polymer into the resin, which increases the volume and weight of the resin product and additionally the polymer may be undesirable in the end products made using the resin, e.g., in the case of thermoset polymers such as rubbers.

There is thus a need for a method for pelletizing a hydrocarbon resin, particularly a neat hydrocarbon resin without an added polymer carrier. There is also a need for a method by which the hydrocarbon resin can be reactively modified and pelletized in a single operation or unit process, without the need for post-rotoforming or post-pelletization processing to achieve the desired chemical modification.

SUMMARY

The invention resides in a method, comprising forming a feed material comprising a hydrocarbon resin into a resin melt, wherein the feed material comprises a Tg (DSC method) of from about 30° C. to about 110° C. and a melt viscosity less than 2500 mPa-s (2500 cP), measured at a temperature 60° C. above the softening point; extruding the resin melt through a multiple-orifice die into a water bath flowing across a surface of the die, wherein the water bath is supplied at a temperature below the Tg of the feed material, to form a plurality of resin extrudates; and cutting the resin extrudates adjacent the die surface to form a slurry of resin pellets.

The invention also resides in a method, comprising heating a feed material comprising a hydrocarbon resin and at least one resin modifier in a compounding extruder to a temperature above the resin softening point up to 215° C. to form a modified resin melt, wherein the feed material has a Tg (DSC method) of from about 30° C. to about 110° C. and a viscosity less than 2.5 Pa-s (2500 cP), measured at a temperature 60° C. above a softening point of the resin; cooling the modified resin melt to a temperature of from 10° C. to 50° C. above the softening point; extruding the cooled modified resin melt through a multiple-orifice die into a water bath flowing across a surface of the die, wherein the water bath is supplied at a temperature below the Tg of the resin, to form a plurality of resin extrudates; cutting the resin extrudates to form a slurry of resin pellets; separating the slurry to recover dewatered resin pellets from a spent water stream; drying the dewatered pellets under low shear conditions; and cooling and recirculating the spent water stream to the water bath.

These and other objects, features, and advantages will become apparent as reference is made to the following detailed description, preferred embodiments, examples, and appended claims.

DETAILED DESCRIPTION

Various specific embodiments, versions, and examples are described herein, including exemplary embodiments and definitions that are adopted for purposes of understanding the claimed invention. While the following detailed description gives specific preferred embodiments, those skilled in the art will appreciate that these embodiments are exemplary only, and that the invention can be practiced in other ways. For purposes of determining infringement, the scope of the invention will refer to any one or more of the appended claims, including their equivalents, and elements or limitations that are equivalent to those that are recited. Any reference to the "invention" may refer to one or more, but not necessarily all, of the inventions defined by the claims.

The term "phr" means parts per hundred parts of rubber by weight, and is a measure common in the art wherein components of a composition are measured relative to the total of all of elastomer (rubber) components. The total phr or parts for all rubber components, whether one, two, three, or more different rubber components are present in a given recipe is always defined as 100 phr. Other non-rubber components are generally proportional to the 100 parts of rubber and the relative amounts may be expressed in phr.

All component percentages listed herein are weight percentages, unless otherwise noted. "Substantially free" of a particular component in reference to a composition is defined to mean that the particular component comprises less than 0.5 wt % in the composition, or more preferably less than 0.25 wt % of the component in the composition, or most preferably less than 0.1 wt % of the component in the composition.

The term "elastomer" as used herein refers to any polymer or combination of polymers consistent with the ASTM D1566 definition, incorporated herein by reference. As used herein, the term "elastomer" may be used interchangeably with the term "rubber."

The term "filler" as used herein refers to any material are used to reinforce or modify physical properties, impart certain processing properties, or reduce cost of an elastomeric composition.

The term "low shear" as used herein refers to conditions wherein the hydrocarbon resin pellets are not substantially damaged and wherein the physical properties of the hydrocarbon resin pellets are not substantially modified or impaired.

As used herein, "immiscibility" is present when experimental techniques to observe the glass transition temperature (Tg) show distinct separate and independent peaks for the elastomer and the interpolymer. Miscible systems on the other hand generally result in a single Tg peak which is shifted from the Tg peak for the elastomer alone, or which has a shoulder, due to the presence of the miscible interpolymer in the elastomer phase. Tg can be determined by differential scanning calorimetry ("DSC").

Underwater Pelletizing Systems

In an embodiment, the hydrocarbon resin is pelletized using an underwater pelletizing system. In an embodiment, the hydrocarbon resin is fed into a melt-mixing device such as an extruder or combination of extruder and melt pump which forces the molten polymer optionally through a screen changer or diverter valve, and then through a die plate. As the polymer emerges from the die, pellets are cut by rotating blades and solidified in the process water flowing in a closed loop across the die face inside the cutting chamber. Representative underwater pelletizing systems, generally used for pelletizing polymer materials, include U.S. Pat. Nos. 4,621,996; 4,728,276; 5,059,103; 5,403,176; 5,624,688; 6,332,765; and 6,551,087; each of which is hereby incorporated herein by reference in its entirety to the extent it is not inconsistent with the present invention, for all jurisdictions where permitted.

In one embodiment, a method is provided which comprises forming a feed material comprising a hydrocarbon resin into a resin melt, extruding the resin melt through a multiple-orifice die into a water bath flowing across a surface of the die to form a plurality of resin extrudates, and cutting the resin extrudates adjacent the die surface to form a slurry of resin pellets. In an embodiment, the feed material consists essentially of a hydrocarbon resin, and in another embodiment, the feed material consists of a hydrocarbon resin. In an embodiment, the feed material has a Tg (DSC method) of from about 30° C. to about 110° C. and a melt viscosity less than 2.5 Pa-s (2500 centipoise [cP]), measured at a temperature 60° C. above the softening point of the feed material. (Ring & Ball Method, as measured by ASTM E-28). In other embodiments, the melt viscosity of the feed material (measured at a temperature 60° C. above the softening point (Ring & Ball Method, as measured by ASTM E-28)) is less than 2.0 Pa-s (2000 cP), less than 1500 mPa-s (1500 cP), or less than 1000 mPa-s (1000 cP). In another embodiment, the water bath is supplied at a temperature below the Tg of the feed material. In an embodiment, the hydrocarbon resin comprises an interpolymer of monomers selected from the group consisting of piperylenes, cyclic pentadienes, aromatics, limonenes, pinenes, amylenes, and combinations thereof.

In an embodiment, the feed material is heated to a temperature 60° C. or more above the softening point of the feed material, e.g., in a melt-mixing mechanism such as an extruder. In an embodiment, the feed material is cooled to a temperature at the die before the extrusion that is less than 50° C. above the softening point and preferably at least 10° C. above the softening point of the feed material. In an embodiment, the feed material is cooled sufficiently to increase the melt viscosity in advance of the die plate to allow it to be extruded and cut at the die face, e.g., above 1 Pa-s (1000 cP), above 1.5 Pa-s (1500 cP), above 2 Pa-s (2000 cP), or above 2.5 Pa-s (2500 cP) such that the feed material forms a resin pellet.

In an embodiment, the slurry of process water and resin pellets is separated to remove dewatered resin pellets from a spent water stream, and the dewatered resin pellets are dried under low shear conditions to minimize fines formation. In an embodiment, the slurry is separated to remove dewatered resin pellets from the spent water stream, and the spent water stream is cooled to a temperature less than 30° C. and recirculated to the water bath. In an embodiment, the slurry and the dewatered resin pellets have a solids particle size distribution comprising 95 wt % above 100 microns, i.e., the pellets are essentially free of fines. In an embodiment, the resin pellets comprise no more than 5 wt % of a polymer having a weight average molecular weight greater than 100,000, by total weight of the hydrocarbon resin.

In an embodiment, the hydrocarbon resin, in either a liquid or solid form, e.g., bricks, granules or powders, with or without flow additives or chemical reactants for modification in the melt, is fed into the melt-mixing mechanism. Any melt-mixing mechanism can be used which is capable of melting and mixing the hydrocarbon resin, together with any additives and/or chemical modifiers that may be added during mixing or upstream from the melt-mixing mechanism. The melt-mixing mechanism is preferably an extruder, e.g., a twin screw, which can be co-rotating or counter-rotating, self wiping extruder, tangential extruder, compounding extruder, or the like.

During the extrusion process, various additives such as stabilizers, performance enhancers, extrusion and processing aids can be added and compounded. If the process includes chemical modification of the hydrocarbon resin, graft monomers, catalysts, free radical initiators, and the like, can alternatively or additionally be added in the manner known by the operators of compounding extruders. The resin melt from the extruder barrel can be transferred under a positive pressure, in an embodiment, from 0.2 MPa to 2.5 MPa, generally smaller die openings requiring higher pressures, using a positive displacement gear pump, a melt pump, or the like. If desired, a screen pack, diverter valve usually with a bypass or the like may be placed between the extruder and the gear pump or melt pump.

The resin melt is passed through a die plate to form a plurality of extrudates at a face of the die in a cutting apparatus such as an underwater pelletizer as previously mentioned. As the extrudates are cut by the rotating blades and solidified in the process water flowing through the cutting chamber across the die face, pellets are formed and transported as a slurry to a water-solids separator, e.g., a screen, centrifuge, or the like, and the pellets are separated and recovered. The process water is contained in a closed loop for cooling and recirculation. The recovered pellets are dried and packaged, e.g., in a bag, box or the like. The pellet handling should minimize fines formation since the pellets are generally brittle and may fracture easily in rotary driers normally used to dry pellets from an underwater pelletizer, before they can be packaged. Fracture of the packaged pellets in the package with concomitant fines formation is generally tolerated by the end users, but packaging and handling techniques to minimize fines formation during storage and transit can also be employed if desired.

In embodiments, the temperature profile of the resin melt, for example, in the melt-mixing mechanism and other feed equipment as well as the die plate is carefully controlled to obtain a suitable pellet morphology in the underwater pelletizing apparatus. The temperature in the extruder mixing and/or reaction zones should be suitable for the degree of mixing and/or reaction desired. Generally, better mixing and reaction rates are obtained at lower viscosities and higher temperatures. In an embodiment, the feed material is heated to a temperature above the softening point of the feed material, preferably at least 10° C. above the softening point, more preferably at least 50° C. above the softening point. In another embodiment, the feed material is heated sufficiently to provide a viscosity less than less than 2.5 Pa-s, (2500 cP), less than 2 Pa-s (2000 cP), less than 1.5 Pa-s (1500 cP), or less than 1 Pa-s (1000 cP). In another embodiment, the feed material is heated sufficiently to facilitate grafting with a graft monomer or another modifying reactant. In another embodiment, the feed material is maintained at a sufficiently low temperature to inhibit thermal degradation, for example, below about 250° C., preferably below about 215° C.

In one embodiment, a cooling zone is provided in advance of the die plate to reduce the temperature of the resin melt (or chemically modified resin melt) to increase the viscosity of the hydrocarbon resin melt exiting the die plate and provide sufficient melt strength and rheological properties to retain a cohesive pellet form until the resin can be solidified, and inhibit smearing of the resin at the die face and fouling of the cutter blades. In an embodiment, the cooling zone cools the resin melt to a temperature below that of the mixing and/or reaction zone, and preferably less than 60° C. above the softening point, more preferably less than 50° C. above the softening point, more preferably less than 40° C. above the softening point, more preferably less than 30° C. above the softening point, more preferably less than 20° C. above the softening point, but preferably not below the softening point of the feed material, more preferably not less than 5° C. above the softening point, more preferably not less than 10° C. above the softening point. In an embodiment, the cooling zone provides a melt viscosity greater than 1 Pa-s, preferably greater than 5 Pa-s, more preferably greater than 10 Pa-s, more preferably greater than 20 Pa-s.

If desired, the die plate can be heated to a temperature above the softening point to inhibit premature solidification of the resin before it can exit the orifice(s), which might lead to plugging or fouling of the die plate. In an embodiment, the water supplied to the cutting chamber of the underwater pelletization system should be tempered to a temperature below the Tg of the feed material, preferably at least 10° C. below the Tg, more preferably at least 20° C. below the Tg, more preferably at least 30° C. below the Tg, more preferably at least 40° C. below the Tg, more preferably at least 50° C. below the Tg. In an embodiment, the water supplied to the cutting chamber has a temperature less than 30° C., preferably less than 25° C., more preferably less than 20° C., more preferably less than 15° C., more preferably less than 10° C. The water can be cooled by employing an indirect heat exchange in the recirculation loop with a cooling medium provided at the necessary temperature and rate.

Hydrocarbon Resins

Hydrocarbon resins useful in this invention include, but are not limited to, aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, and hydrogenated rosin esters. In some embodiments, the hydrocarbon resin is hydrogenated. In other embodiments, the hydrocarbon resin is non-polar. As used herein, non-polar means that the hydrocarbon resin is substantially free of monomers having polar groups.

As used herein, reference to monomers in the hydrocarbon resin or interpolymer is understood to refer to the as-polymerized and/or as-derivatized units derived from that monomer. The terms polymer and interpolymer are used broadly herein and in the claims to encompass higher oligomers having a number average molecular weight (Mn) equal to or greater than 500, as well as compounds that meet the molecular weight requirements for polymers according to classic ASTM definitions.

The hydrocarbon resins can be used as elastomer compounding materials. Depending on how the elastomer and hydrocarbon resin are compounded, optimization of rubber characteristics for rubber and tire durability, traction, and abrasion resistance can be achieved. The macrostructure (molecular weight, molecular weight distribution, and branching) of the hydrocarbon resin can provide unique properties when used as a polymer additive.

Suitable hydrocarbon resins may include both aromatic and nonaromatic components. Differences in the hydrocarbon resins are largely due to the olefins in the feedstock from which the hydrocarbon components are derived. The hydrocarbon resin may contain "aliphatic" hydrocarbon components which have a hydrocarbon chain formed from $C_4$-$C_6$ fractions containing variable quantities of piperylene, isoprene, mono-olefins, and non-polymerizable paraffinic compounds. Such hydrocarbon resins are based on pentene, butene, isoprene, piperylene, and contain reduced quantities of cyclopentadiene or dicyclopentadiene.

The hydrocarbon resin may also contain "aromatic" hydrocarbon structures having polymeric chains which are formed of aromatic units, such as styrene, xylene, α-methylstyrene, vinyl toluene, and indene. In one embodiment, the hydrocarbon resin may contain an aromatic content to match the aromatic content of an elastomer component(s) in which it is to be compounded, e.g., a high aromatic content in styrene rubbers, or a low aromatic content in natural rubbers, for compatibility or miscibility. Compatibility is desired, for example, where the hydrocarbon resin is used to change or shift the Tg of the elastomer domain, where improved dispersion of the hydrocarbon resin is desired, and/or where compatibility facilitates inhibition of hydrocarbon resin migration in the elastomeric composition. Compatibility may also be desired where the hydrocarbon resin or hydrocarbon resin derivative is otherwise immiscible with the elastomer component(s) for another reason, such as, for example, a high molecular weight hydrocarbon resin, coupling of the hydrocarbon resin to the filler, or the presence of hydrocarbon resin-derived units such as an hydrocarbon resin-elastomer-co-graft which limits the mobility of the bound hydrocarbon resin and/or facilitates dispersion of the coupled filler particles.

In another embodiment, the hydrocarbon resin may contain an aromatic content to impart incompatibility or immiscibility with the elastomer component(s), e.g., a low aromatic content in styrene rubbers, or a high aromatic content in natural rubbers. Incompatibility may be beneficial where, for example, the hydrocarbon resin is not required or desired to shift or change the Tg of the elastomer phase, especially where the mobility of the hydrocarbon resin may be inhibited by high molecular weight, coupling to the filler(s), co-curing with the elastomer component(s), or any combination thereof.

In accordance with an embodiment, the hydrocarbon resin to be used in rubber compounding includes olefins such as one or more of piperylene, isoprene, amylenes, and cyclic components. The hydrocarbon resin may also contain aromatic olefins such as styrenic components and indenic components.

The functionalized hydrocarbon resin in embodiments is preferably made from a monomer mixture comprising from 1 wt % to 60 wt % piperylene components, from 5 wt % to 50 wt % cyclic components, and from 1 wt % to 60 wt % aromatic, preferably styrenic components. Alternatively or additionally, in an embodiment, the hydrocarbon resin comprises an interpolymer of from 10 wt % to 80 wt % units derived from at least one piperylene component, from 15 wt % to 50 wt % units derived from at least one cyclic pentadiene component, and from 10 wt % to 30 wt % units derived from at least one styrenic component. The monomer mixture or the interpolymer may optionally comprise up to 5% isoprene, up to 10% amylene components, up to 5% indenic components, or any combination thereof.

Piperylene components are generally a distillate cut or synthetic mixture of $C_5$ diolefins, which include, but are not limited to, cis-1,3-pentadiene, trans-1,3-pentadiene, and mixed 1,3-pentadiene. For example, the piperylene component in one embodiment can include trans-pentadiene-1,3, cyclopentene, cis-pentadiene and mixtures thereof. In general, piperylene components do not include branched $C_5$ diolefins such as isoprene. In one embodiment, the hydrocarbon resin is prepared from a monomer mix having from 0.1 wt % to 90 wt % piperylene components, or with a range of piperylene components from any lower limit selected from 0.1%, 1%, 10%, 20%, 25%, 30%, 35%, 40%, 45%, or 50% piperylene components up to any higher upper limit selected from 80%, 75%, 70%, 65%, 60%, 55%, 50%, 45%, 40%, or 35% piperylene components, by weight of the total monomers in the monomer mixture. In a particularly preferred embodiment, the hydrocarbon resin is prepared from a monomer mix comprising from 40% to 80% piperylene components, or from 40% to 65% piperylene components, or from 40% to 50% piperylene components.

In one embodiment, the hydrocarbon resin is substantially free of isoprene. In another embodiment, the hydrocarbon resin is prepared from a monomer mix that contains up to 15% isoprene, or less than 10% isoprene, by weight of the monomers in the mix. In yet another embodiment, the monomer mix contains less than 5% isoprene by weight of the monomers in the mix.

In general, the amylene component acts as a chain transfer agent to inhibit molecular weight growth. In an embodiment, the amylene component is selected from the group consisting of 2-methylbutene-1,2-methylbutene-2, pentene-1, cis-pentene-2, trans-pentene-2 and mixtures thereof. In one embodiment, the hydrocarbon resin is substantially free of amylene derived units. In another embodiment, the monomer mix contains up to 40% amylene, or less than 30% amylene, or less than 25% amylene, or less than 20% amylene or less than 15% amylene or less than 10% amylene or less than 5% amylene, by weight of the monomers in the monomer mix. In yet another embodiment, the hydrocarbon resin is prepared from a monomer mix of from 0.1% up to 10% amylene, by weight of the monomers in the mixture.

Cyclic components are generally a distillate cut or synthetic mixture of $C_5$ and $C_6$ cyclic olefins, diolefins, and dimers, codimers and trimers, etc. from a distillate cut. Cyclics include, but are not limited to, cyclopentene, cyclopentadiene, dicyclopentadiene, cyclohexene, 1,3-cyclohexadiene, and 1,4-cyclohexadiene. A preferred cyclic is cyclopentadiene. The dicyclopentadiene may be in either the endo or exo form. The cyclics may or may not be substituted. Preferred substituted cyclics include cyclopentadienes and dicyclopentadienes substituted with a $C_1$ to $C_{40}$ linear, branched, or cyclic alkyl group, preferably one or more methyl groups. In one embodiment, the cyclic components are selected from the group consisting of: cyclopentadiene, cyclopentadiene dimer, cyclopentadiene trimer, cyclopentadiene-$C_5$ codimer, cyclopentadiene-piperylene codimer, cyclopentadiene-$C_4$ codimer, cyclopentadiene-methyl cyclopentadiene codimer, methyl cyclopentadiene, methyl cyclopentadiene dimer, and mixtures thereof.

In general, the cyclic components increase the softening point. On the other hand, aromatics such as styrene tend to reduce the softening point, but the softening point decrease can be offset by increasing the relative proportion of cyclic component(s). In one embodiment, the hydrocarbon resin may be prepared from a monomer mix that can include up to 60% cyclics or up to 50% cyclics, by weight of the monomers in the mix. Typical lower limits include at least about 0.1% or at least about 0.5% or from about 1.0% cyclics in the monomer mix. In at least one embodiment, the hydrocarbon resin monomer mix may include more than 10% cyclic components up to 20% cyclics or more, or preferably up to 30% cyclics or more, or more preferably up to 40% cyclics or more, or more preferably up to 45% or 50% cyclics or more, by weight of the monomers in the monomer mixture from which the hydrocarbon resin is prepared. In a particularly preferred embodiment, the monomer mixture comprises from about 10% to about 50% cyclics, or from about 20% to about 45% cyclics, or from about 20% to about 40% cyclic components.

Preferred aromatics that may be in the hydrocarbon resin include one or more of styrene, indene, derivatives of styrene, and derivatives of indene. Particularly preferred aromatic olefins include styrene, alpha-methylstyrene, beta-methylstyrene, indene, and methylindenes, and vinyl toluenes. In general, styrenic components do not include fused-rings, such as indenics. Styrenic components include styrene, derivatives of styrene, and substituted sytrenes. In one embodiment, the aromatic component is a styrenic component that is selected from the group consisting of styrene, ortho-methyl-styrene, meta-methyl-styrene, paramethyl-styrene, α-methyl-styrene, t-beta-methyl-styrene, indene, methyl indene, vinyl toluene, and mixtures thereof. The aromatic or styrenic olefins in an embodiment are present in the hydrocarbon resin up to 60 wt % styrenic components or up to 50 wt %, typically from 5 wt % to 45 wt %, or more preferably from 5 wt % to 30 wt %. In particularly preferred embodiments, the hydrocarbon resin comprises from 10 wt % to 25 wt % aromatic or especially styrenic olefins.

The hydrocarbon resin may comprise less than 15 wt % indenic components, or less than 10 wt % indenic components. Indenic components include indene and derivatives of indene. In one embodiment, the hydrocarbon resin comprises less than 5 wt % indenic components. In another embodiment, the hydrocarbon resin is substantially free of indenic components.

In one embodiment, the hydrocarbon resin can have a weight ratio of units derived from aromatic components to units derived from cyclic components, or preferably of styrenic components to cyclic components, of from 1:2 to 3:1, preferably from 1:2 to 2.5:1, or more preferably from 0.8:1 to 2.2:1, or from about 1:1 to about 2:1.

In another embodiment, the hydrocarbon resin can comprise from at least 1 mole percent aromatic hydrogen, based on the total moles of hydrogen in the interpolymer as determined by proton nuclear magnetic resonance (H-NMR). In another embodiment, the hydrocarbon resin comprises at least 5 mol % aromatic hydrogen, e.g., from 5 mol % to 30 mol % aromatic hydrogen, or preferably from 5 mol % to 25 mol % aromatic hydrogen, or more preferably from 5 mol % to 20 mol % aromatic hydrogen, or more preferably from 8 mol % to 15 mol % aromatic hydrogen. In another embodiment, the hydrocarbon resin comprises from 1 mol % to 20 mol % aromatic hydrogen, or preferably from 2 mol % to 15 mol % aromatic hydrogen, or more preferably from 2 mol % to 10 mol % aromatic hydrogen.

In one embodiment, the hydrocarbon resin is not hydrogenated (to retain the olefin unsaturation, especially terminal vinyl groups). In another embodiment, the hydrocarbon resin may be partially hydrogenated (especially to remove terminal vinyl groups, where desired). The hydrogenation of the hydrocarbon resin may be carried out by any method known in the art, and the invention is not limited by the method of hydrogenation. For example, the hydrogenation of the hydrocarbon resin may be either a batchwise or a continuous process, e.g., catalytically hydrogenated. Catalysts employed for the hydrogenation of hydrocarbon resin are typically supported monometallic and bimetallic catalyst systems based on elements from Group 6, 8, 9, 10, or 11 of the Periodic Table of Elements.

In one embodiment, the hydrocarbon resin is at least partially hydrogenated or may be substantially hydrogenated. As used herein at least partially hydrogenated means that the material contains less than 90% olefinic protons, more preferably less than 75% olefinic protons, more preferably less than 50% olefinic protons, more preferably less than 40% olefinic protons, more preferably less than 25% olefinic protons, more preferably less than 15% olefinic protons, more preferably less than 10% olefinic protons, more preferably less than 9% olefinic protons, more preferably less than 8% olefinic protons, more preferably less than 7% olefinic protons, and more preferably less than 6% olefinic protons. As used herein, substantially hydrogenated means that the material contains less than 5% olefinic protons, more preferably less than 4% olefinic protons, more preferably less than 3% olefinic protons, more preferably less than 2% olefinic protons, more preferably less than 1% olefinic protons, more preferably less than 0.5% olefinic protons, more preferably less than 0.1% olefinic protons, and more preferably less than 0.05% olefinic protons after hydrogenation (and before reaction with the graft monomer).

The degree of hydrogenation, when employed, is typically conducted so as to minimize and preferably avoid hydrogenation of the aromatic bonds. In embodiments wherein the hydrocarbon resin is substantially hydrogenated, it is believed that the graft monomer is appended to the resin backbone as opposed to forming a copolymer (of resin and graft monomers) because of the lack of terminal olefinic bonds on the substantially hydrogenated hydrocarbon resin (as indicated by the preferred low olefinic proton measurements).

In other embodiments where the hydrocarbon resin is not hydrogenated or only partially hydrogenated, the presence of terminal olefinic bonds facilitates terminal silylation, terminal organosilane coupling agent functionalization or other functionalization and/or terminal crosslinking, which may improve hydrocarbon resin-elastomer compatibilization and better retention of properties modified by the hydrocarbon resin.

In one embodiment there is only one interpolymer in the hydrocarbon resin. In another embodiment, two or more interpolymers may be blended. When two or more interpolymers are used, either at least one of the interpolymers, or the resulting blended hydrocarbon resin, preferably both, may preferably comprise from 10 wt % to 80 wt % units derived from at least one piperylene component, from 15 wt % to 50 wt % units derived from at least one cyclic pentadiene component, and from 10 wt % to 30 wt % units derived from at least one aromatic, preferably styrenic components. The hydrocarbon resin blend may optionally comprise up to 5% isoprene, up to 10% amylene, and up to 5% indenic components. Preferably, the elastomeric composition compounded therewith comprises from 5 phr to 50 phr of hydrocarbon resin or hydrocarbon resin blend.

In another embodiment, the hydrocarbon resin is an interpolymer of (i) a piperylene component; (ii) an aromatic component; and (iii) a cyclic pentadiene component. The cyclic pentadiene component comprises a dicyclopentadiene fraction (DCPD fraction) and a dimethylcyclopentadiene fraction (MCPD fraction), wherein the DCPD fraction consists of any cyclopentadiene dimers and/or cyclopentadiene codimers other than CPD-MCPD, and wherein the MCPD fraction consists of any methylcyclopentadiene dimers and/or methylcyclopentadiene codimers, including any CPD-MCPD codimers. Methylcyclopentadiene codimers include codimers of methylcyclopentadiene with cyclopentadiene, piperylene, butadiene, and so on. Cyclopentadiene codimers include codimers of cyclopentadiene with piperylene, butadiene, and so on. In an embodiment, the DCPD fraction comprises at least 50 wt % of dicyclopentadiene and less than 50 wt % CPD codimers. A weight ratio of the MCPD fraction to the DCPD fraction is preferably from 0.8 to 20, more preferably 1 to 10, and the MCPD fraction is at least 20 wt % of the cyclic pentadiene component. When the proportion of the MCPD fraction exceeds about 0.8 or 1.0 times the proportion of the DCPD fraction in the cyclic component, the interpolymer can unexpectedly have a balance of softening point, molecular weights, molecular weight distribution and aromaticity, for example, a softening point from 40° C. to 160° C., Mn greater than 400, Mw/Mn from 1.5 to 4, Mz less than 15,000, and at least 8 mol % aromatic hydrogen, based on the total moles of hydrogen in the interpolymer, or preferably, a softening point of at least 80° C., Mn greater than 800, Mw/Mn less than 3, Mz less than 12,000 and/or at least 10 mol % aromatic hydrogen. Mn is herein defined as the number-average molecular weight, Mw is herein defined as the weight-average molecular weight, and Mz herein defined as the z-average molecular weight.

The hydrocarbon resin in embodiments is preferably made from a monomer mixture comprising from 15 wt % to 70 wt % piperylene components, from 5 wt % to 70 wt % cyclic components, and from 10% to 30% aromatic, preferably styrenic components. Alternatively or additionally, in an embodiment, the hydrocarbon resin comprises an interpolymer of from 30 wt % to 60% units derived from at least one piperylene component, from 10 wt % to 50 wt % units derived from at least one cyclic pentadiene component, and from 10% to 25% units derived from at least one styrenic component. The monomer mixture or the interpolymer may optionally comprise up to 5 wt % isoprene, up to 10 wt % amylene components, up to 5% indenic components, or any combination thereof.

Generally hydrocarbon resins in one embodiment have a number average molecular weight (Mn) greater than about 600 g/mole, or greater than about 800 g/mole, or greater than about 900 g/mole, or greater than about 1000 g/mole. In an embodiment the hydrocarbon resin has a Mn between about 900 g/mole and 3000 g/mole, or between about 1000 g/mole and 1500 g/mole. In at least one embodiment, hydrocarbon resins have a weight average molecular weight (Mw) greater than about 2500 g/mole, or greater than about 5000 g/mole, or from about 2500 g/mole to about 25,000 g/mole, or from 3000 g/mole to 20,000 g/mole. Preferably, hydrocarbon resins have a weight average molecular weight of from 3500 g/mole to 15,000 g/mole, or more preferably from about 5000 g/mole to about 10,000 g/mole. The hydrocarbon resin may have a z-average molecular weight (Mz) greater than about 10,000 g/mole, or greater than about 20,000 g/mole, or greater than about 30,000 g/mole. In embodiments, Mz ranges from 10,000 g/mole to 150,000 g/mole, or from 20,000 g/mole to 100,000 g/mole, or from 25,000 g/mole to 75,000 g/mole, or from 30,000 g/mole to 60,000 g/mole. Mw, Mn, and Mz may be determined by gel permeation chromatography (GPC).

In one embodiment, the hydrocarbon resin has a polydispersion index ("PDI", PDI=Mw/Mn) of 4 or less. In a particularly preferred embodiment, the hydrocarbon resin has a PDI of at least about 2.5, or at least about 3, or at least about 4, or at least about 5. In embodiments, Mz/Mn is greater than 5, greater than 10, greater than 12, greater than 15, greater than 20, greater than 25, or greater than 30. In embodiments, Mz/Mn ranges up to 150 or more, up to 100, up to 80, or up to 60. In other embodiments, Mz/Mn is from 5 to 100, or from 10 to 80, or from 10 to 60, or from 10 to 40, or from 10 to 30, or from 15 to 40, or from 30 to 60 or from 35 to 60.

In an embodiment, the hydrocarbon resin can have a softening point of 80° C. to 160° C., or preferably 100° C. to 160° C., or more preferably from 110° C. to 150° C. Softening point can be determined according to the Ring & Ball Method, as measured by ASTM E-28.

In an embodiment, the hydrocarbon resin can have a glass transition temperature (Tg) of from about 30° C. to about 110° C., or from 30° C. to 90° C., or from 30° C. to 60° C., or from about 50° C. to 110° C., or from about 60° C. to 100° C. Differential scanning calorimetry (DSC) may be used to determine the Tg of the hydrocarbon resin.

In another embodiment, the resin pellets can have a glass transition temperature (Tg) of from about 30° C. to about 110° C., or from 30° C. to 90° C., or from 30° C. to 60° C., or from about 50° C. to 110° C., or from about 60° C. to 100° C.

The resins described above may be produced by methods generally known in the art for the production of hydrocarbon resins, and the invention is not limited by the method of forming the hydrocarbon resin. Preferably, the hydrocarbon resin is produced by combining the olefin feed stream in a polymerization reactor with a Friedel-Crafts or Lewis Acid catalyst at a temperature between 0° C. and 200° C. Friedel-Crafts polymerization is generally accomplished by use of known catalysts in a polymerization solvent, and the solvent and catalyst may be removed by washing and distillation. The polymerization process utilized may be batchwise or continuous mode. Continuous polymerization may be accomplished in a single stage or in multiple stages.

In an embodiment, the hydrocarbon resin supplied to the melt-mixing mechanism is essentially free or substantially free of added materials so that the feed material comprising the hydrocarbon resin has a Tg within 5° C. of that of the neat hydrocarbon resin and/or a melt viscosity at 177° C. that is no more than 10% greater than that of the neat hydrocarbon resin. In an embodiment, the feed material comprising the hydrocarbon resin comprises no more than 10 wt % of a polymer having a weight average molecular weight (Mw) greater than 100,000, preferably no more than 5 wt % of a polymer having a weight average molecular weight greater than 100,000, more preferably no more than 2 wt % of a polymer having a weight average molecular weight greater than 100,000, more preferably no more than 1 wt % of a polymer having a weight average molecular weight greater than 100,000, more preferably no more than 0.1 wt % of a polymer having a weight average molecular weight greater than 100,000, by weight of the hydrocarbon resin. In an embodiment, the feed material comprising the hydrocarbon resin contains no or essentially no added polymer having a weight average molecular weight greater than 20,000, greater than 40,000, greater than 60,000, greater than 80,000, or greater than 100,000. In another embodiment, the feed material comprising the hydrocarbon resin is substantially free of added polymer having a weight average molecular weight greater than 20,000, greater than 40,000, greater than 60,000, greater than 80,000, or greater than 100,000. In another embodiment, the feed material comprises from 0.01 wt % up to 10 wt %, preferably from 0.1 wt % up to 5 wt %, of an added polymer having a weight average molecular weight of at least 100,000, e.g., a polyolefin such as polyethylene, polypropylene or the like.

In an embodiment, the hydrocarbon resin comprises an interpolymer comprising (i) at least one piperylene component; (ii) at least one cyclic pentadiene component; and (iii) at least one aromatic component, wherein the interpolymer comprises a softening point from 80° to 160° C.

In an embodiment, the hydrocarbon resin comprises an interpolymer of monomers selected from the group consisting of piperylenes, cyclic pentadienes, aromatics, limonenes, pinenes, amylenes, and combinations thereof, and wherein the interpolymer comprises at least 1 mol % olefinic hydrogen, based on the total moles of hydrogen in the interpolymer.

In one embodiment, the hydrocarbon resin can comprise an interpolymer comprising (i) at least one piperylene component; (ii) at least one cyclic pentadiene component; and (iii) at least one aromatic component, wherein the interpolymer comprises a softening point from 40° to 160° C. As one example, the interpolymer can have a softening point from 110° to 150° C., number average molecular weight greater than 800, weight average molecular weight greater than 2500, z average molecular weight greater than 20,000 and at least 5 mol % aromatic hydrogen.

In another example, the interpolymer comprises (i) a piperylene component; (ii) an aromatic component; and (iii) a cyclic pentadiene component comprising a dicyclopentadiene fraction (DCPD fraction) and a dimethylcyclopentadiene fraction (MCPD fraction), wherein a weight ratio of the MCPD fraction to the DCPD fraction is from 0.8:1 to 100:1, wherein the MCPD fraction is at least 20 wt % of the cyclic pentadiene component, and wherein the interpolymer comprises (a) Mn greater than 400; (b) Mz less than 15,000; and (c) at least 8 mole percent aromatic hydrogen, based on the total moles of hydrogen in the interpolymer.

In other embodiments, the interpolymer is prepared from a monomer mixture comprising from 60 wt % to 90 wt % piperylene components, from 5 wt % to 15 wt % cyclic components, and from 5 wt % to 20 wt % aromatic components, by weight of the monomer mixture; or additionally or alternatively, the interpolymer has a weight average molecular weight of from 520 g/mole to 650 g/mole and a Tg of from 48° C. to 53° C.

Hydrocarbon Resin Modification

In an embodiment, the hydrocarbon resin is chemically modified in a reaction zone of the melt-mixing mechanism. In one embodiment, the hydrocarbon resin is grafted with a graft comonomer. Grafting is the process of combining, contacting, or reacting the hydrocarbon resin, oligomers and/or resin material with the graft monomer. Grafting hydrocarbon resins to include at least some polar functionality, for example, produces useful components for many applications. The grafting process can yield grafted hydrocarbon resin or a mixture of grafted and ungrafted hydrocarbon resin.

In another embodiment, a method is provided which comprises heating a feed material comprising a hydrocarbon resin and at least one resin modifier in a compounding extruder to a temperature above the resin softening point up to 215° C. to form a modified resin melt, cooling the modified resin melt to a temperature of from 10° C. to 50° C. above the softening point, extruding the cooled modified resin melt through a multiple-orifice die into a water bath flowing across a surface of the die to form a plurality of resin extrudates, cutting the resin extrudates to form a slurry of resin pellets, separating the slurry to recover dewatered resin pellets from a spent water stream, drying the dewatered pellets under low shear conditions, and cooling and recirculating the spent water stream to the water bath. In an embodiment, the feed material has a Tg (DSC method) of from about 30° C. to about 110° C. and a viscosity less than 2.5 Pa-s (2500 cP) or less than 2.0 Pa-s (2000 cP) or less than 1.5 Pa-s (1500 cP) or less than 1.0 Pa-s (1000 cP), measured at a temperature 60° C. above a softening point of the feed material (Ring & Ball Method, as measured by ASTM E-28). In an embodiment, the resin pellets comprise no more than 5 wt % of a polymer having a weight average molecular weight greater than 100,000, by total weight of the hydrocarbon resin. In an embodiment, the water bath is supplied at a temperature below the Tg of the resin.

In an embodiment, the at least one resin modifier comprises a bifunctional organosilane crosslinking agent of the formula:

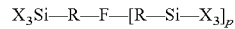

$X_3Si-R-F-[R-Si-X_3]_p$ wherein each X is independently a silicon functional group, each R is independently a divalent substituted or unsubstituted hydrocarbon group of from 1 to 20 carbon atoms, F is a monovalent or multivalent organo-functional group, p is 0 when F is monovalent and p is at least 1 when F is multivalent. In an embodiment, X is hydroxy or $R^1$—O— wherein $R^1$ is an alkyl, alkoxyalkyl, aryl, aralkyl or cycloalkyl group of up to 20 carbon atoms, R is alkylene, wherein p is 0 or 1, and when p is 0 F is selected from amino, amido, hydroxy, alkoxy, halo, mercapto, carboxy, acyl, vinyl, allyl, styryl, ureido, epoxy, isocyanato, glycidoxy, acryloxy and hydrosilyl groups, and when p is 1 F is divalent polysulfide of from 2 to 20 sulfur atoms.

In embodiments, the at least one resin modifier comprises a peroxide compound and/or a catalyst.

In one embodiment, the weight ratio of graft monomer: resin in a grafted resin product is preferably between 1:1000 and 1:1, more preferably between 1:100 and 1:1, more preferably between 1:50 and 1:1, more preferably between 1:10 and 1:1, more preferably between 1:3 and 1:1, and even more preferably between 1:100 and 3:10.

In an embodiment of the invention, the graft monomer is selected from acids, anhydrides, imides, amides, alcohols and/or derivatives thereof. Preferred graft monomers in one embodiment include any unsaturated organic compound containing at least one olefinic bond and at least one polar group such as a carbonyl group, which includes unsaturated acids and anhydrides and derivatives thereof. Preferably, the organic compound contains an ethylenic unsaturation conjugated with a carbonyl group (—C—O) and preferably contains at least one α,β olefin bond. Examples include carboxylic acids, acid halides or anhydrides, phenols, alcohols, ethers, ketones, alkyl and aromatic amines, nitriles, imines, isocyanates, nitrogen compounds, halides and combinations and derivatives thereof. Representative acids and acid derivatives include carboxylic acids, anhydrides, acid halides, esters, amides, imides and their salts, both metallic and non-metallic. Examples include maleic, fumaric, acrylic, methacrylic, itaconic, aconitic, citraconic, himic, tetrahydrophthalic, crotonic, α-methyl crotonic, and cinnamic acids. Maleic anhydride is a particularly preferred graft monomer. Particular examples include, itaconic anhydride, citraconic anhydride, methyl acrylate, methyl methacrylate, ethyl acrylate, ethyl methacrylate, glycidyl acrylate, monoethyl maleate, diethyl maleate, dibutyl maleate, monomethyl fumarate, dimethyl fumarate, monomethyl itaconate, diethyl itaconate, acrylamide, methacrylamide, maleic acid monoamide, maleic acid diamide, maleic acid-N-monoethylamide, maleic acid-N,N-diethylamide, maleic acid-N-monobutylamide, maleic acid-N,N-dibutylamide, fumaric acid monoamide, fumaric acid diamide, fumaric acid-N-monobutylamide, fumaric acid-N,N-dibutylamide, maleimide, N-butylmaleimide, N-phenylmaleimide, sodium acrylate, sodium methacrylate, potassium acrylate and potassium methacrylate. A mixture of two or more of the aforementioned graft monomers may be used.

In a further embodiment, the graft monomer is used in conjunction with a free radical initiator. The free radical initiator may be selected from the group consisting of peroxides, comprising benzoyl peroxide, dichlorobenzoyl peroxide, dicumyl peroxide, di-tert-butyl peroxide, 2,5-dimethyl-2,5-di(peroxybenzoate)hexyne-3,1,4-bis(tert-butylperoxyisopropyl)benzene, lauroyl peroxide, tert-butyl peracetate, 2,5-dimethyl-2,5-di(tert-butylperoxy)hexyne-3, 2,5-dimethyl-2,5-di(tert-butylperoxy)hexane, tert-butyl perbenzoate, tert-butylperphenyl acetate, tert-butyl perisobutyrate, tert-butyl per-sec-octoate, tert-butyl perpivalate, cumyl perpivalate, tert-butyl hydroperoxide, tert-butyl perdiethylacetate, azoisobutyronitrile, dimethyl azoisobutyrate, and the like and mixtures of two or more thereof. The peroxide preferably has a half-life of about 7 times the residence time in the reactor at processing temperature. Preferred peroxides include di-tert-butyl peroxide and 2,5-dimethyl-2,3-di(tert-butylperoxy)hexane. The amount of peroxide employed is typically dependent on the weight of the graft monomer. In one embodiment, the weight ratio of the graft monomer:peroxide in the reaction mixture may be between 1:1 and 100:1, more preferably between about 2:1 and 50:1, more preferably between about 5:1 and about 20:1 and even more preferably about 16:1.

The graft monomer, once reacted with the resin/polymer mixture, may be further reacted in situ or by a separate process. For example, if maleic anhydride is used as the graft monomer it may be further reacted with a variety of reactive molecules such as amines or alcohols, e.g., a primary amine. Other molecules called charge transfer complex agents can also be used to enhance the level of grafting. Such molecules comprise but are not limited to styrene and substituted styrenes.

In another embodiment, the graft monomer may be added in an amount so that the weight ratio of graft monomer:resin material is less than 1:1, more preferably less than 5:10, more preferably less than 3:10, even more preferably less than 3:20, and most preferably less than 5:50. A free radical initiator may be combined with the resin/polyolefin-graft monomer reaction mixture either in one addition or preferably in a continuous or semi-continuous mode during the reaction. Residence time in the reaction zone of the extruder, is typically 10 seconds to 3 minutes, typically 1 to 3 minutes.

It is believed that the graft monomer is grafted to the resin material through an olefinic bond of the graft monomer such as an α,β olefinic bond. It is believed that by grafting the hydrocarbon resin via this route, the formation of norbornyl ester groups in the grafted resin material can be minimized and preferably avoided in one embodiment. The resulting grafted resins in one embodiment are preferably at least one of a (i) a mono-alkyl succinic acid, anhydride or derivative thereof, or (ii) a β-alkyl substituted propanoic acid or derivative thereof. The reaction product of the resin material and graft monomer or the product of the combination of the resin material and the graft monomer may also include some oligomers of the graft monomer, which may or may not be removed before formulating a final composition.

In another embodiment, the graft monomer comprises a silane structure, and may optionally comprise one or more additional functional groups such as olefinic unsaturation, benzylic halogen, or the like. When employed in an elastomeric composition, the grafted resin in this embodiment can be coupled to the filler, the elastomer or otherwise anchored in the elastomeric matrix. In a particular embodiment, the hydrocarbon resin comprises olefinic unsaturation, e.g., at least 1 mol % olefinic hydrogen, based on the total moles of hydrogen in the hydrocarbon resin as determined by H-NMR. Olefinic unsaturation generally results from the interpolymerization of diolefinic monomers such as piperylenes, dicyclopentadienes, etc. Olefinic unsaturation is beneficial to facilitate grafting, crosslinking with the elastomer component(s), for example, or combinations thereof, or the like.

In one embodiment, the grafted hydrocarbon resin comprises a silane structure as the functional group, e.g., a pendant —$SiX_3$ group where X is independently a silicon functional group such as hydroxy, alkoxy, alkoxyalkoxy, aryloxy, aralkoxy or cycloalkoxy group of up to 20 carbon atoms. The silicon functional group X can further optionally be substituted with or coupled to a silicate, e.g., at the surface of a silica filler particle. The silane structure can be provided by silylating the hydrocarbon resin with an organofunctional silane compound, or by dynamically functionalizing the grafted hydrocarbon resin in the elastomeric composition with a bifunctional organosilane crosslinking agent, or the like.

In one embodiment, one or more silane coupling agents are used to treat the hydrocarbon resin or a functionalized hydrocarbon resin (functionalized with a functional group other than a silicon functional group, e.g., an organofunctional group that is reactive with an organofunctional group of a bifunctional silane coupling agent) to provide silicon functionality, either in the melt-mixing mechanism or dynamically in the elastomeric compositions. Such coupling agents are particularly desirable when employed in an elastomeric composition wherein silica is the primary filler, or is present in combination with another filler, as they help bind the silica to the hydrocarbon resin, and can also help bind the silica to the elastomer. The coupling agent may be a bifunctional organosilane crosslinking agent. An "organosilane crosslinking agent" is any silane coupled filler and/or crosslinking activator and/or silane reinforcing agent known to those skilled in the art including, but not limited to, vinyl triethoxysilane, vinyl-tris-(beta-methoxyethoxy)silane, methacryloylpropyltrimethoxysilane, gamma-aminopropyl triethoxysilane, gamma-mercaptopropyltrimethoxysilane, and the like, and mixtures thereof. In various embodiments, depending on the manner in which they are incorporated, sulfide-type, mercapto-type, vinyl-type, amino-type, glycidoxy-type, nitro-type and chloro-type silane coupling agents may be used, alone or in any combination. Examples of silane coupling agents include silane esters, amino silanes, amido silanes, ureido silanes, halo silanes, epoxy silanes, vinyl silanes, methacryloxy silanes, mercapto silanes, and isocyanato silanes.

In one embodiment, the bifunctional organosilane crosslinking agent has the formula:

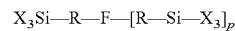

$$X_3Si—R—F—[R—Si—X_3]_p$$

wherein each X is independently a silicon functional group, each R is independently a divalent substituted or unsubstituted hydrocarbon group of from 1 to 20 carbon atoms, preferably up to 10 carbon atoms, and especially from 1 to 5 carbon atoms; F is a monovalent or multivalent organofunctional group; p is 0 when F is monovalent and p is at least 1, e.g., from 1 to 5, when F is multivalent. In an embodiment, X is hydroxy or $R^1$—O— wherein $R^1$ is an alkyl, alkoxyalkyl, aryl, aralkyl or cycloalkyl group of up to 20 carbon atoms, preferably up to 10 carbon atoms, and especially from 1 to 5 carbon atoms, R is alkylene preferably up to 10 carbon atoms, and especially from 1 to 5 carbon atoms, wherein p is 0 or 1, and when p is 0 F is selected from amino, amido, hydroxy, alkoxy, halo, mercapto, carboxy, acyl, vinyl, allyl, styryl, ureido, epoxy, isocyanato, glycidoxy, and acryloxy groups, and when p is 1 F is divalent polysulfide of from 2 to 20 sulfur atoms.

Examples of vinyl-type silane coupling agents are vinyl triethoxysilane and vinyl trimethoxysilane.

Examples of amino-type silane coupling agents are 3-aminopropyltriethoxysilane, 3-aminopropyltrimethoxysilane, 3-(2-aminoethyl)aminopropyltriethoxysilane and 3-(2-aminoethyl)aminopropyltrimethoxysilane.

Examples of glycidoxy-type silane coupling agents are γ-glycidoxypropyltriethoxysilane, γ-glycidoxypropyltrimethoxysilane, γ-glycidoxypropylmethyldiethoxysilane and γ-glycidoxypropylmethyldimethoxysilane.

Examples of nitro-type silane coupling agents are 3-nitropropyltrimethoxysilane and 3-nitropropyltriethoxysilane.

Examples of chloro-type silane coupling agents are 3-chloropropyltrimethoxysilane, 3-chloropropyltriethoxysilane, 2-chloroethyltrimethoxysilane and 2-chloroethyltriethoxysilane.

Specific examples of sulfide-type silane coupling agents are bis(3-triethoxysilylpropyl)tetrasulfide, bis(2-triethoxysilylethyl)tetrasulfide, bis(3-trimethoxysilylpropyl)tetrasulfide, bis(2-trimethoxysilylethyl)tetrasulfide,bis(3-triethoxysilylpropyl)trisulfide, bis(3-trimethoxysilylpropyl) trisulfide, bis(3-triethoxysilylpropyl)disulfide, bis(3-trimethoxysilylpropyl)disulfide, 3-trimethoxysilylpropyl-N,N-dimethylthio carbamoyltetrasulfide, 3-triethoxysilylpropyl-N,N-dimethylthio carbamoyltetrasulfide, 2-triethoxysilylethyl-N,N-dimethylthio carbamoyltetrasulfide, 2-trimethoxysilylethyl-N,N-dimethylthio carbamoyltetrasulfide, 3-trimethoxysilylpropylbenzothiazolyl tetrasulfide, 3-triethoxysilylpropylbenzothiazole tetrasulfide, 3-triethoxysilylpropylmethacrylate monosulfide and 3-trimethoxysilylpropylmethacrylate monosulfide. In an embodiment, the silane coupling agent may have the general formula $(C_nH_{2n+1}O)_3Si—(CH_2)_m—S_p—(CH_2)_m—Si(C_nH_{2n+1}O)_3$ wherein n represents an integer of 1 to 3, m represents an integer of 1 to 9, p represents an average number of sulfur atoms and a positive number of more than 2.

Examples of mercapto-type silane coupling agents are 3-mercaptopropyltrimethoxysilane, 3-mercaptopropyltriethoxysilane, 2-mercaptoethyltrimethoxysilane and 2-mercaptoethyltriethoxysilane.

These silane coupling agents can be used alone or two or more kinds can be used together.

Preferred examples of silane coupling agents in one embodiment can include: N-(2-aminoethyl)-3-aminopropyltrimethoxysilane, 3-methacryloxypropyltrimethoxysilane, 3-(2-(vinylbenzylamino)ethylamino)-propyltrimethoxysilane, 3-glycidoxypropyltrimethoxysilane, triacetoxyvinylsilane, tris-(2-methoxyethoxy)-vinylsilane, 3-chloropropyltrimethoxysilane, 1-trimethoxysilyl-2-(p,m-chloromethyl) phenylethane, 3-chloropropyltriethoxysilane, N-(aminoethylaminomethyl)phenyltrimethoxysilane, N-(2-aminoethyl)-3-aminopropyl tris(2-ethylhexoxy)silane, 3-aminopropyltrimethoxysilane, trimethoxysilylpropylenetriamine, β(3,4-epoxycyclohexyl)ethyltrimethoxysilane, 3-mercaptopropyltrimethoxysilane, 3-mercaptotriethoxysilane, 3-mercaptopropylmethyldimethoxysilane, bis(2-hydroxyethyl)-3-aminopropyltrimethoxysilane, 1,3-divinyltetramethyldisilazane, vinyltrimethoxysilane, 2-(diphenylphosphino)ethyltriethoxysilane, 2-methacryloxyethyldimethyl[3-trimethoxysilylpropyl]ammonium chloride, 3-isocyanatopropyldimethylethoxysilane, N-(3-acryloxy-2-hydroxypropyl)-3-aminopropyltriethoxysilane, vinyl tris(t-butylperoxy)silane, methyltrimethoxysilane, ethyltrimethoxysilane, phenyltrimethoxysilane, phenyltriacetoxysilane, methyltrimethoxysilane, phenyltrimethoxysilane.

The more preferred silane coupling agents are those which are commercially available and which are recognized by those skilled in the art as being effective coupling agents. A number of organofunctional silanes are available, for example, from Union Carbide, Specialty Chemicals Division, Danbury, Conn. Examples of useful silane coupling agents available from Union Carbide are disclosed in EP 0 926 265 A1, which is hereby incorporated herein by reference.

In one embodiment, the silane coupling agent is a ureido silane represented by the formula $B_{(4-n)}—Si—(A—N(H)—C(O)—NH_2)_n$ wherein A is an alkylene group containing from 1 to about 8 carbon atoms, B is a hydroxy or alkoxy group containing from 1 to about 8 carbon atoms and n is an integer from 1 to 3 provided that if n is 1 or 2, each B may be the same or different. In one embodiment, each B is an alkoxy group containing 1 to about 5 carbon atoms, particularly methyloxy or ethyloxy groups, and A is a divalent hydrocarbon group containing from 1 to about 5 carbon atoms. Examples of such divalent hydrocarbon groups include methylene, ethylene, propylene, butylene, etc. Specific examples of such ureido silanes include β-ureidoethyl-trimethoxysilane; β-ureidoethyl-triethoxysilane; γ-ureidoethyl-trimethoxysilane; γ-ureidopropyl-triethoxysilane, etc.

In one embodiment, a hydrocarbon resin with or without olefinic unsaturation, e.g., piperylene, C5/C9, dicyclopentadiene limonene and pinene based interpolymers, is treated in the melt-mixing mechanism with the bifunctional organosilane crosslinking agent and a peroxide initiator. The peroxide initiator forms a free radical on the hydrocarbon resin which reacts with the organofunctional groups of the crosslinking agent, e.g., vinyl or sulfhydryl. The resulting grafted hydrocarbon resin has pendant silane structures which, during elastomeric compounding, can react with the filler to couple the hydrocarbon resin to the filler and should have only limited reactivity with the elastomer during curing:

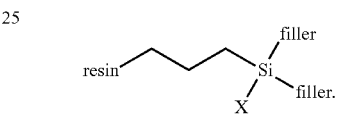

As an alternative option, hydrosilylation can be used to react with a functional group of the hydrocarbon resin or grafted hydrocarbon resin, e.g., a terminal vinyl group, to add a reactive silane group, amine group, alkylamine group or the like:

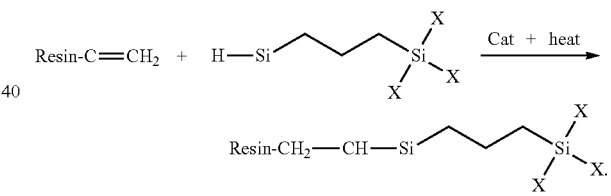

Elastomeric Composition Compounding

In another embodiment, the hydrocarbon resin or grafted hydrocarbon resin with olefinic unsaturation can be dynamically coupled to silica filler during the vulcanization of the elastomer with sulfur, for example. During curing the sulfur linkages in sulfide-type silane coupling agents generally cleave to graft onto the olefinic unsaturation in the hydrocarbon resin (as well as the elastomer), thereby coupling the silica filler to the hydrocarbon resin, in one or multiple crosslinks, depending on the degree of functionalization:

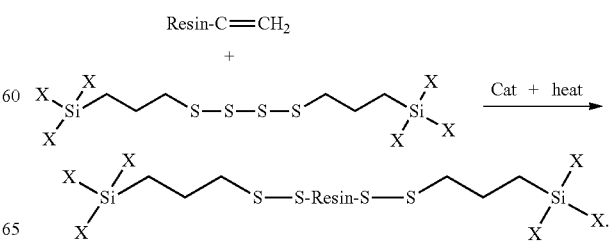

This cure system used in the elastomeric compounding can stabilize the hydrocarbon resin or grafted hydrocarbon resin by coupling to the filler, and also by co-curing with the elastomer where there is excess reactive olefinic unsaturation in the hydrocarbon resin, and further by increasing shear during mixing of the elastomeric composition, thereby increasing viscosity of the system via the filler-coupled hydrocarbon resin.

In an embodiment, the method further comprises melt processing the resin pellets in an elastomeric mixture comprising at least one elastomer, a filler comprising silica, and a cure package, to form an elastomeric composition in the shape of an article, coupling the filler to a silane functional group of the bifunctional organosilane crosslinking agent, and curing the elastomeric composition to form the article. In an embodiment, a build component is adhered to a surface of the elastomeric composition and co-curing the build component with the article to form a construct. In an embodiment, the construct comprises a tire and the article comprises a tire tread, a tire innerliner or a tire carcass.

In another embodiment, a method is provided which comprises: mixing a hydrocarbon resin and a graft monomer in a reaction zone of a melt-mixing mechanism to graft the graft monomer onto the hydrocarbon resin and form a grafted hydrocarbon resin melt, wherein the hydrocarbon resin has a Tg (DSC method) of from about 30° C. to about 110° C. and a viscosity less than 1000 mPa-s (1000 cP), measured at the temperature of the reaction zone (Ring & Ball Method, as measured by ASTM E-28); cooling the grafted hydrocarbon resin melt in a cooling zone of the melt-mixing mechanism to a temperature below the temperature of the reaction zone and above the softening point up to 50° C. above the softening point; extruding the cooled grafted hydrocarbon resin melt through a multiple-orifice die into a water bath flowing across a surface of the die, wherein the water bath is supplied at a temperature below the Tg of the resin, to form a plurality of grafted hydrocarbon resin extrudates; cutting the grafted hydrocarbon resin extrudates at the surface of the die to form a slurry of grafted hydrocarbon resin pellets; separating the slurry to recover dewatered grafted hydrocarbon resin pellets from a spent water stream; and cooling and recirculating the spent water stream to the water bath. In an embodiment, the resin melt comprises no more than 5 wt % of a polymer having a weight average molecular weight greater than 100,000, by total weight of the hydrocarbon resin. In an embodiment, the hydrocarbon resin comprises an interpolymer of monomers selected from the group consisting of piperylenes, cyclic pentadienes, aromatics, limonenes, pinenes, amylenes, and combinations thereof.

In an embodiment, the graft monomer comprises a bifunctional organosilane crosslinking agent of the formula:

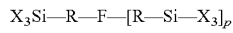

$X_3Si\text{—}R\text{—}F\text{—}[R\text{—}Si\text{—}X_3]_p$ wherein each X is independently a silicon functional group, each R is independently a divalent substituted or unsubstituted hydrocarbon group of from 1 to 20 carbon atoms, F is a monovalent or multivalent organo-functional group, p is 0 when F is monovalent and p is at least 1 when F is multivalent. In an embodiment, X is hydroxy or $R^1\text{—}O\text{—}$ wherein $R^1$ is an alkyl, alkoxyalkyl, aryl, aralkyl or cycloalkyl group of up to 20 carbon atoms, R is alkylene, wherein p is 0 or 1, and when p is 0 F is selected from amino, amido, hydroxy, alkoxy, halo, mercapto, carboxy, acyl, vinyl, allyl, styryl, ureido, epoxy, isocyanato, glycidoxy, acryloxy and hydrosilyl groups, and when p is 1 F is divalent polysulfide of from 2 to 20 sulfur atoms.

In another embodiment, in the above formulae, when p is 0 F can be selected from amino, amido, hydroxy, alkoxy, halo, mercapto, hydrosilyl, carboxy, acyl, vinyl, allyl, styryl, ureido, epoxy, isocyanato, glycidoxy, and acryloxy groups, and when p is 1 F can be divalent polysulfide of from 2 to 20 sulfur atoms.

In embodiments, a peroxide compound and/or a catalyst are introduced into the reaction zone.

In another embodiment, the hydrocarbon resin is functionalized with at least one functional group, and in another embodiment, the at least one functional group comprises a silane structure to provide at least one silane-functionalized hydrocarbon resin ("Si—HR"). The Si—HR can be anchored via the functional group(s) to another component in the elastomeric composition, e.g., a filler and/or polymer depending on the nature of the functional group(s), significantly improving long term elastomeric performance, e.g., in a tire or tire component. The elastomeric compositions of the present invention are useful in a variety of applications such as pneumatic tire components, hoses, belts, solid tires, footwear components, rollers for graphic arts applications, vibration isolation devices, pharmaceutical devices, adhesives, sealants, protective coatings, and bladders for fluid retention and curing purposes. In tire tread compounds, one embodiment of the present invention allows the tire compounder to improve the wet traction with the use of a high-Tg hydrocarbon resin while maintaining or improving tread wear and rolling resistance through improved filler dispersion. For example, the resin can be coupled to the filler, optionally without reacting with the elastomer or cure system. The final products present in the elastomer composition in various embodiments can include elastomer-resin-filler complexes, resin-filler complexes, elastomer-resin-elastomer complexes, elastomer-filler complexes, combinations thereof, and the like.

In another embodiment, silanes capable of reacting or interacting with the filler and curing into the elastomer matrix may also be included in the compounding formulation or process.

In an embodiment, the silane-grafted hydrocarbon resin further comprises one or more organofunctional groups in addition to the silane functionality by which the hydrocarbon resin can be crosslinked to itself, coupled to the filler or the elastomer, or otherwise anchored in the elastomeric matrix. These grafted hydrocarbon resins are capable of creating and participating in cross-linking within the composition medium by cross-linking with the other components of the adhesive formulation. In one example, residual olefinic unsaturation in the silane-grafted hydrocarbon resin can participate in the curing reaction, or can react with the organofunctionality in a crosslinking or coupling agent, e.g., a bifunctional organosilane coupling agent. In another example, anhydride or acid groups in the silane-grafted hydrocarbon resin can cross-link with themselves or with other polymers present in the composition medium.

The elastomeric composition can include, in addition to the silicon-grafted hydrocarbon resin, a non-functionalized hydrocarbon resin or a hydrocarbon resin functionalized with a functional group(s) other than silane functional groups, such as, for example, the grafted resins, grafted oligomers and/or blends thereof described in U.S. Pat. No. 7,294,664, incorporated herein by reference. The hydrocarbon resin blends may be obtained by blending separate grafted hydrocarbon resin and/or ungrafted hydrocarbon resin components with the silylated hydrocarbon resin, by partially functionalizing the hydrocarbon resin, and/or by partially silane-functionalizing the hydrocarbon resin and/or partially functionalized hydrocarbon resin.

Some polymers containing amine or alcoholic functionality will react directly with the grafted hydrocarbon resin, e.g., those polymers containing some vinyl alcohol groups will react with carboxylic acid-functionalized hydrocarbon resin or silylated hydrocarbon resin. Other polymers will cross-link when a cross-linking agent is added. In these embodiments, the amount of cross-linking agent added is typically dependent on the amount of graft monomer present. Typical amounts include between 100:1 and 1:100, more preferably 1:1 parts cross linking agent per parts graft monomer (molar ratio) present in the formulation. These include polymers containing some acrylic acid such as ethylene alkyl-acrylate acrylic acid terpolymers or polymers containing succinic anhydride or acid groups such as maleic anhydride grafted ethylene propylene diene rubbers. Such cross-linking can be achieved in many ways, including the addition of difunctional agents capable of reacting with the acid or anhydride groups. Examples of such materials are those containing alcohol and amine functionality such as diols, diamines, especially primary amines. The material having these functional groups may be mixed or have different substitutions, for example a diamine where one group is primary and the other is tertiary. Weaker cross-linking can be achieved via interactions which do not form covalent bonds such as ionic and hydrogen bonds. Examples of materials capable of cross-linking in such a manner are divalent metal ions such as Ca<++> or diamines containing quaternary amines. In an embodiment, crosslinking agents include alcohols, polyols, amines, diamines and/or tri-amines. Examples of organofunctional crosslinking agents in one embodiment include polyamines such as ethylenediamine, diethylenetriamine, hexamethylenediamine, diethylaminopropylamine, and/or methanediamine.

Accordingly, the invention provides the following embodiments:

A. A method, comprising:
  forming a feed material comprising a hydrocarbon resin into a resin melt, wherein the feed material comprises a Tg (DSC method) of from about 30° C. to about 110° C. and a melt viscosity less than 2.5 mPa-s (2500 cP), less than 2000 mPa-s (2000 cP), less than 1.5 mPa-s (1500 cP) or less than 1.0 mPa-s (1000 cP) measured at a temperature 60° C. above the softening point;
  extruding the resin melt through a multiple-orifice die into a water bath flowing across a surface of the die, wherein the water bath is supplied at a temperature below the Tg of the feed material, to form a plurality of resin extrudates; and
  cutting the resin extrudates adjacent the die surface to form a slurry of resin pellets.

B. The method of embodiment A, wherein the hydrocarbon resin comprises an interpolymer comprising at least one monomer chosen from piperylenes, cyclic pentadienes, aromatics, limonenes, pinenes, and amylenes.

C. The method of embodiment A or embodiment B, further comprising heating the resin melt to a temperature 60° C. or more above the softening point.

D. The method of any one of embodiments A to C, further comprising cooling the resin melt to a temperature at the die before the extrusion that is less than 50° C. above the softening point and at least 10° C. above the softening point.

E. The method of one of embodiments A to D, further comprising separating the slurry to remove dewatered resin pellets from a spent water stream and drying the dewatered resin pellets under low shear conditions.

F. The method of one of embodiments A to E, further comprising separating the slurry to remove dewatered resin pellets from a spent water stream, cooling the spent water stream to a temperature less than 30° C. and recirculating the cooled stream to the water bath.

G. The method of one of embodiments A to F, wherein the recovered resin pellets have a Tg of from 30° C. to 60° C. wherein the slurry and the dewatered resin pellets have a solids particle size distribution comprising 95 wt % above 100 microns.

H. The method of one of embodiments A to G, wherein the resin pellets comprise no more than 5 wt % of a polymer having a weight average molecular weight greater than 100,000, by total weight of the hydrocarbon resin.

I. The method of one of embodiments A to H, further comprising introducing at least one reactant into the resin melt to functionalize the resin.

J. The method of one of embodiments A to I, wherein the resin melt is passed through an extruder.

K. The method of one of embodiments A to J, wherein the resin melt is passed through a melt gear pump.

L. The method of one of embodiments A to K, further comprising:
  melt processing the resin pellets in an elastomeric mixture comprising at least one elastomer, a filler, and a cure package, to form an elastomeric composition in the shape of an article; and
  curing the elastomeric composition to form the article.

M. A method, comprising:
  heating a feed material comprising a hydrocarbon resin and at least one resin modifier in a compounding extruder to a temperature above the resin softening point up to 215° C. to form a modified resin melt, wherein the feed material has a Tg (DSC method) of from about 30° C. to about 110° C. and a viscosity less than 2.5 Pa-s (2500 cP), less than 2 Pa-s (2000 cP), less than 1.5 Pa-s (1500 cP) or less than 1 Pa-s (1000 cP) measured at a temperature 60° C. above a softening point of the resin;
  cooling the modified resin melt to a temperature of from 10° C. to 50° C. above the softening point;
  extruding the cooled modified resin melt through a multiple-orifice die into a water bath flowing across a surface of the die, wherein the water bath is supplied at a temperature below the Tg of the resin, to form a plurality of resin extrudates;
  cutting the resin extrudates to form a slurry of resin pellets;
  separating the slurry to recover dewatered resin pellets from a spent water stream;
  drying the dewatered pellets under low shear conditions; and
  cooling and recirculating the spent water stream to the water bath.

N. The method of embodiment M, wherein the at least one resin modifier comprises a bifunctional organosilane crosslinking agent of the formula:

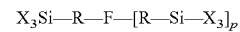

wherein each X is independently a silicon functional group, each R is independently a divalent substituted or unsubstituted hydrocarbon group of from 1 to 20 carbon atoms, F is a monovalent or multivalent organofunctional group, p is 0 when F is monovalent and p is at least 1 when F is multivalent.

O. The method of embodiment N, wherein X is hydroxy or $R^1$—O— wherein $R^1$ is an alkyl, alkoxyalkyl, aryl, aralkyl or cycloalkyl group of up to 20 carbon atoms, R is alkylene, wherein p is 0 or 1, and when p is 0 F is selected from amino, amido, hydroxy, alkoxy, halo, mercapto, carboxy, acyl, vinyl, allyl, styryl, ureido, epoxy, isocyanato, glycidoxy, acryloxy and hydrosilyl groups, and when p is 1 F is divalent polysulfide of from 2 to 20 sulfur atoms.

P. The method of any one of embodiments M to O, wherein the at least one resin modifier comprises a peroxide compound.

Q. The method of any one of embodiments M to P, wherein the at least one resin modifier comprises a catalyst.

R. The method of any one of embodiments M to Q, wherein the hydrocarbon resin comprises an interpolymer comprising (i) at least one piperylene component; (ii) at least one cyclic pentadiene component; and (iii) at least one aromatic component, wherein the interpolymer comprises a softening point from 80° to 160° C.

S. The method of any one of embodiments M to R, wherein the hydrocarbon resin comprises an interpolymer of monomers selected from the group consisting of piperylenes, cyclic pentadienes, aromatics, limonenes, pinenes, amylenes, and combinations thereof, and wherein the interpolymer comprises at least 1 mol % olefinic hydrogen, based on the total moles of hydrogen in the interpolymer.

T. The method of any one of embodiments M to S, further comprising:
melt processing the resin pellets in an elastomeric mixture comprising at least one elastomer, a filler comprising silica, and a cure package, to form an elastomeric composition in the shape of an article;
coupling the filler to a silane functional group of the bifunctional organosilane crosslinking agent; and
curing the elastomeric composition to form the article.

U. The method of embodiment T, further comprising adhering a build component to a surface of the elastomeric composition and co-curing the build component with the article to form a construct.

V. The method of embodiment U, wherein the construct comprises a tire and the article comprises a tire tread, a tire innerliner or a tire carcass.

W. A method, comprising:
mixing a hydrocarbon resin and a graft monomer in a reaction zone of a melt-mixing mechanism to graft the graft monomer onto the hydrocarbon resin and form a grafted hydrocarbon resin melt, wherein the hydrocarbon resin has a Tg (DSC method) of from about 30° C. to about 110° C. and a viscosity less than less than 2500 mPa-s (2500 cP), less than 2.0 Pa-s (2000 cP), less than 1500 mPa-s (1500 cP) or less than 1000 mPa-s (1000 cP), measured at the temperature of the reaction zone;
cooling the grafted hydrocarbon resin melt in a cooling zone of the melt-mixing mechanism to a temperature below the temperature of the reaction zone and above the softening point up to 50° C. above the softening point;
extruding the cooled grafted hydrocarbon resin melt through a multiple-orifice die into a water bath flowing across a surface of the die, wherein the water bath is supplied at a temperature below the Tg of the resin, to form a plurality of grafted hydrocarbon resin extrudates;
cutting the grafted hydrocarbon resin extrudates at the surface of the die to form a slurry of grafted hydrocarbon resin pellets;
separating the slurry to recover dewatered grafted hydrocarbon resin pellets from a spent water stream; and
cooling and recirculating the spent water stream to the water bath.

X. The method of embodiment W, wherein the hydrocarbon resin comprises an interpolymer of monomers selected from the group consisting of piperylenes, cyclic pentadienes, aromatics, limonenes, pinenes, amylenes, and combinations thereof.

Y. The method of embodiment W or embodiment X, wherein the graft monomer comprises a bifunctional organosilane crosslinking agent of the formula:

$X_3Si$—R—F—$[R$—$Si$—$X_3]_p$ wherein each X is independently a silicon functional group, each R is independently a divalent substituted or unsubstituted hydrocarbon group of from 1 to 20 carbon atoms, F is a monovalent or multivalent organofunctional group, p is 0 when F is monovalent and p is at least 1 when F is multivalent.

Z. The method of embodiment Y, wherein X is hydroxy or $R^1$—O— wherein $R^1$ is an alkyl, alkoxyalkyl, aryl, aralkyl or cycloalkyl group of up to 20 carbon atoms, R is alkylene, wherein p is 0 or 1, and when p is 0 F is selected from amino, amido, hydroxy, alkoxy, halo, mercapto, carboxy, acyl, vinyl, allyl, styryl, ureido, epoxy, isocyanato, glycidoxy, acryloxy and hydrosilyl groups, and when p is 1 F is divalent polysulfide of from 2 to 20 sulfur atoms.

AA. The method of any one of embodiments W to Z, further comprising supplying a peroxide compound to the reaction zone.

BB. The method of any one of embodiments W to AA, further comprising supplying a catalyst to the reaction zone.

EXAMPLE

In this example, a commercially available hydrocarbon resin, OPPERA PR373, having a Tg of 39° C. and a softening point of 89° C., was pelletized on a GALA SLC-6 underwater pelletizing unit, feeding with a 46.7 L/D COPERION ZSK twin screw compounding extruder, without any additives. The throughput was 60 kg/h, the extruder speed was 125 rpm, the load was 16.1%, the power consumption was 4.8 kW and the specific energy was 0.0798 kWh/kg. The melt gear pump speed was 9.7 rpm, the efficiency was 107% and the load was 2.5%. The following temperature set point profile was used:

TABLE 1

Process Set Point and Zone Temperatures

| Zone | Set Point, ° C. | Zone (Metal) Temperature, ° C. |
|---|---|---|
| Barrel Section 1 | Not heated | 27.6 |
| Barrel Section 2 | 70 | 74.1 |
| Barrel Section 3 | 80 | 85.3 |

TABLE 1-continued

Process Set Point and Zone Temperatures

| Zone | Set Point, ° C. | Zone (Metal) Temperature, ° C. |
|---|---|---|
| Barrel Section 4 | 90 | 90.7 |
| Barrel Section 5 | 100 | 101 |
| Barrel Section 6 | 120 | 119.4 |
| Barrel Section 7 | 140 | 137.2 |
| Barrel Section 8 | 160 | 157.6 |
| Barrel Section 9 | 170 | 157 |
| Barrel Section 10 | 180 | 179.2 |
| Barrel Section 11 | 180 | 175.6 |
| Barrel Section 12 | 170 | 160.9 |
| Barrel Section 13 | 150 | 150 |
| Barrel Section 14 | 120 | 120.7 |
| Barrel Section 15 | 120 | 121.1 |
| Melt Gear Pump, Inlet | 120 | 112 |
| Melt Gear Pump | 120 | 130 |
| Melt Gear Pump, Outlet | 120 | 113.4 |
| Die | 150 | 148.5 |

Irregularly shaped pellets of generally cylindrical form were obtained with very little evidence of fines. The pellets were removed from the water stream before entering the pellet spin dryer and were subsequently dried in a secondary drying step by placing them in a cylindrical bed and passing warm air through the bed without fluidization.

The invention has been described above with reference to numerous embodiments and specific examples. Many variations will suggest themselves to those skilled in this art in light of the above detailed description. All such obvious variations are within the full intended scope of the appended claims.

We claim:

1. A method, comprising:
   forming a feed material comprising a hydrocarbon resin into a resin melt, wherein the feed material comprises a Tg (DSC method) of from about 30° C. to about 110° C. and a melt viscosity less than 2500 mPa-s (2500 cP), measured at a temperature 60° C. above the softening point;
   introducing at least one reactant into the resin melt to functionalize the resin;
   extruding the resin melt through a multiple-orifice die into a water bath flowing across a surface of the die, wherein the water bath is supplied at a temperature below the Tg of the feed material, to form a plurality of resin extrudates; and
   cutting the resin extrudates adjacent the die surface to form a slurry of resin pellets.

2. The method of claim 1, wherein the hydrocarbon resin comprises an interpolymer comprising at least one monomer chosen from piperylenes, cyclic pentadienes, aromatics, limonenes, pinenes, and amylenes.

3. The method of claim 2, wherein the at least one monomer is chosen from limonenes and pinenes.

4. The method of claim 1, further comprising heating the resin melt to a temperature 60° C. or more above the softening point.

5. The method of claim 1, further comprising cooling the resin melt to a temperature at the die before the extrusion that is less than 50° C. above the softening point and at least 10° C. above the softening point.

6. The method of claim 1, further comprising separating the slurry to remove resin pellets from a spent water stream to form dewatered resin pellets and drying the dewatered resin pellets under low shear conditions.

7. The method of claim 1, further comprising separating the slurry to remove resin pellets from a spent water stream to form dewatered resin pellets, cooling the spent water stream to a temperature less than 30° C. and recirculating the cooled stream to the water bath.

8. The method of claim 1, further comprising separating the slurry to remove resin pellets from a spent water stream to form dewatered resin pellets, wherein the resin pellets have a Tg of from 30° C. to 60° C., and wherein the slurry and the dewatered resin pellets have a solids particle size distribution comprising 95 wt % above 100 microns.

9. The method of claim 1, wherein the resin pellets comprise no more than 5 wt % of a polymer having a weight average molecular weight greater than 100,000, by total weight of the hydrocarbon resin.

10. The method of claim 1, wherein the resin melt is passed through an extruder.

11. The method of claim 10, wherein the resin melt is passed through a melt gear pump.

12. The method of claim 1, further comprising:
   melt processing the resin pellets in an elastomeric mixture comprising at least one elastomer, a filler, and a cure package, to form an elastomeric composition in the shape of an article; and
   curing the elastomeric composition to form the article.

13. A method, comprising:
   heating a feed material comprising a hydrocarbon resin and at least one resin modifier in a compounding extruder to a temperature above the resin softening point up to 215° C. to form a modified resin melt, wherein the feed material has a Tg (DSC method) of from about 30° C. to about 110° C. and a viscosity less than 2.5 Pa-s (2500 cP), measured at a temperature 60° C. above a softening point of the resin;
   cooling the modified resin melt to a temperature of from 10° C. to 50° C. above the softening point;
   extruding the cooled modified resin melt through a multiple-orifice die into a water bath flowing across a surface of the die, wherein the water bath is supplied at a temperature below the Tg of the resin, to form a plurality of resin extrudates;
   cutting the resin extrudates to form a slurry of resin pellets;
   separating the slurry to remove resin pellets from a spent water stream to form dewatered resin pellets;
   drying the dewatered pellets under low shear conditions; and
   cooling and recirculating the spent water stream to the water bath.

14. The method of claim 13, wherein the at least one resin modifier comprises a bifunctional organosilane crosslinking agent of the formula:

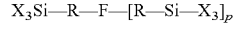

$X_3Si-R-F-[R-Si-X_3]_p$ wherein each X is independently a functional group of silicon, each R is independently a divalent substituted or unsubstituted hydrocarbon group of from 1 to 20 carbon atoms, F is a monovalent or multivalent organofunctional group, p is 0 when F is monovalent and p is at least 1 when F is multivalent.

15. The method of claim 14, wherein X is hydroxy or $R^1$—O— wherein $R^1$ is an alkyl, alkoxyalkyl, aryl, aralkyl or cycloalkyl group of up to 20 carbon atoms, R is alkylene, wherein p is 0 or 1, and when p is 0 F is selected from amino, amido, hydroxy, alkoxy, halo, mercapto, carboxy, acyl, vinyl, allyl, styryl, ureido, epoxy, isocyanato, glycidoxy, acryloxy and hydrosilyl groups, and when p is 1 F is divalent polysulfide of from 2 to 20 sulfur atoms.

16. The method of claim 13, wherein the at least one resin modifier comprises a peroxide compound.

17. The method of claim 13, wherein the at least one resin modifier comprises a catalyst.

18. The method of claim 13, wherein the hydrocarbon resin comprises an interpolymer comprising (i) at least one piperylene component; (ii) at least one cyclic pentadiene component; and (iii) at least one aromatic component, wherein the interpolymer comprises a softening point from 80° C. to 160° C.

19. The method of claim 13, wherein the hydrocarbon resin comprises an interpolymer of monomers selected from the group consisting of piperylenes, cyclic pentadienes, aromatics, limonenes, pinenes, amylenes, and combinations thereof, and wherein the interpolymer comprises at least 1 mol % olefinic hydrogen, based on the total moles of hydrogen in the interpolymer.

20. The method of claim 14, further comprising:
melt processing the resin pellets in an elastomeric mixture comprising at least one elastomer, a filler comprising silica, and a cure package, to form an elastomeric composition in the shape of an article;
coupling the filler to a silane functional group of the bifunctional organosilane crosslinking agent; and
curing the elastomeric composition to form the article.

21. The method of claim 20, further comprising adhering a build component to a surface of the elastomeric composition and co-curing the build component with the article to form a construct.

22. The method of claim 21, wherein the construct comprises a tire and the article comprises a tire tread, a tire innerliner or a tire carcass.

23. A method, comprising:
mixing a hydrocarbon resin and a graft monomer in a reaction zone of a melt-mixing mechanism to graft the graft monomer onto the hydrocarbon resin and form a grafted hydrocarbon resin melt, wherein the hydrocarbon resin has a Tg (DSC method) of from about 30° C. to about 110° C. and a viscosity less than 2500 mPa-s (2500 cP), measured at the temperature of the reaction zone;
cooling the grafted hydrocarbon resin melt in a cooling zone of the melt-mixing mechanism to a temperature below the temperature of the reaction zone and above the softening point up to 50° C. above the softening point;
extruding the cooled grafted hydrocarbon resin melt through a multiple-orifice die into a water bath flowing across a surface of the die, wherein the water bath is supplied at a temperature below the Tg of the resin, to form a plurality of grafted hydrocarbon resin extrudates;
cutting the grafted hydrocarbon resin extrudates at the surface of the die to form a slurry of grafted hydrocarbon resin pellets;
separating the slurry to remove grafted hydrocarbon resin pellets from a spent water stream to form dewatered grafted hydrocarbon resin pellets; and
cooling and recirculating the spent water stream to the water bath, and
wherein the hydrocarbon resin comprises an interpolymer of monomers selected from the group consisting of piperylenes, cyclic pentadienes, aromatics, limonenes, pinenes, amylenes, and combinations thereof and wherein the graft monomer comprises a bifunctional organosilane crosslinking agent of the formula:

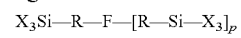

wherein each X is independently a functional group of silicon, each R is independently a divalent substituted or unsubstituted hydrocarbon group of from 1 to 20 carbon atoms, F is a monovalent or multivalent organofunctional group, p is 0 when F is monovalent and p is at least 1 when F is multivalent.

24. The method of claim 23, wherein X is hydroxy or $R^1$—O— wherein $R^1$ is an alkyl, alkoxyalkyl, aryl, aralkyl or cycloalkyl group of up to 20 carbon atoms, R is alkylene, wherein p is 0 or 1, and when p is 0 F is selected from amino, amido, hydroxy, alkoxy, halo, mercapto, carboxy, acyl, vinyl, allyl, styryl, ureido, epoxy, isocyanato, glycidoxy, acryloxy and hydrosilyl groups, and when p is 1 F is divalent polysulfide of from 2 to 20 sulfur atoms.

25. The method of claim 23, further comprising supplying a peroxide compound to the reaction zone.

* * * * *